(12) United States Patent
Fukushima

(10) Patent No.: US 8,326,384 B2
(45) Date of Patent: Dec. 4, 2012

(54) INFORMATION PROCESSING APPARATUS UTILIZING AN ANTENNA SWITCH

(75) Inventor: Kazuya Fukushima, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 118 days.

(21) Appl. No.: 12/904,991

(22) Filed: Oct. 14, 2010

(65) Prior Publication Data

US 2011/0130148 A1    Jun. 2, 2011

(30) Foreign Application Priority Data

Nov. 30, 2009  (JP) ................................ 2009-272695

(51) Int. Cl.
*G06F 1/16*    (2006.01)
(52) U.S. Cl. ............... 455/575.7; 455/575.1; 455/575.4; 455/575.3
(58) Field of Classification Search ............... 455/552.1, 455/575.5–575.7; 343/702
See application file for complete search history.

(56) References Cited

U.S. PATENT DOCUMENTS

| | | | |
|---|---|---|---|
| 2003/0130017 A1* | 7/2003 | Shiotsu et al. ................ | 455/575 |
| 2003/0157944 A1 | 8/2003 | Nakao et al. | |
| 2005/0037822 A1* | 2/2005 | Regnier et al. ............. | 455/575.5 |
| 2008/0068271 A1* | 3/2008 | Iwai et al. ..................... | 343/702 |
| 2008/0238794 A1* | 10/2008 | Pan et al. ..................... | 343/767 |
| 2008/0261647 A1 | 10/2008 | Hamada | |
| 2010/0248799 A1* | 9/2010 | Lum et al. .................. | 455/575.7 |
| 2010/0304785 A1* | 12/2010 | Marlett et al. ............. | 455/552.1 |

FOREIGN PATENT DOCUMENTS

| | | |
|---|---|---|
| JP | 2002-232319 A | 8/2002 |
| JP | 2003-111127 | 4/2003 |
| JP | 2003-244288 | 8/2003 |
| JP | 2004-153310 | 5/2004 |
| JP | 2005-252386 | 9/2005 |
| JP | 2006-319451 A | 11/2006 |
| WO | WO 2007/060734 | 5/2007 |

OTHER PUBLICATIONS

Japanese Office Action dated Jan. 18, 2011 of corresponding Japanese Patent Application No. 2009-272695, in 5 pages.

* cited by examiner

*Primary Examiner* — Jinsong Hu
*Assistant Examiner* — Nathan Taylor
(74) *Attorney, Agent, or Firm* — Knobbe, Martens, Olson & Bear LLP

(57) ABSTRACT

According to one embodiment, a bus slot includes a first terminal not connected to a bus on the system board, and second terminals connected to the bus. The bus slot is configured to be connected to either a first wireless communication module or a second wireless communication module. The first terminal is grounded when the first wireless communication module is connected to the bus slot, and is kept in an open state when the second wireless communication module is connected to the bus slot. An antenna switching module is configured to switch an antenna connected to be a feed line between a first antenna and a second antenna in accordance with a voltage on a control signal line connected to the first terminal.

13 Claims, 3 Drawing Sheets

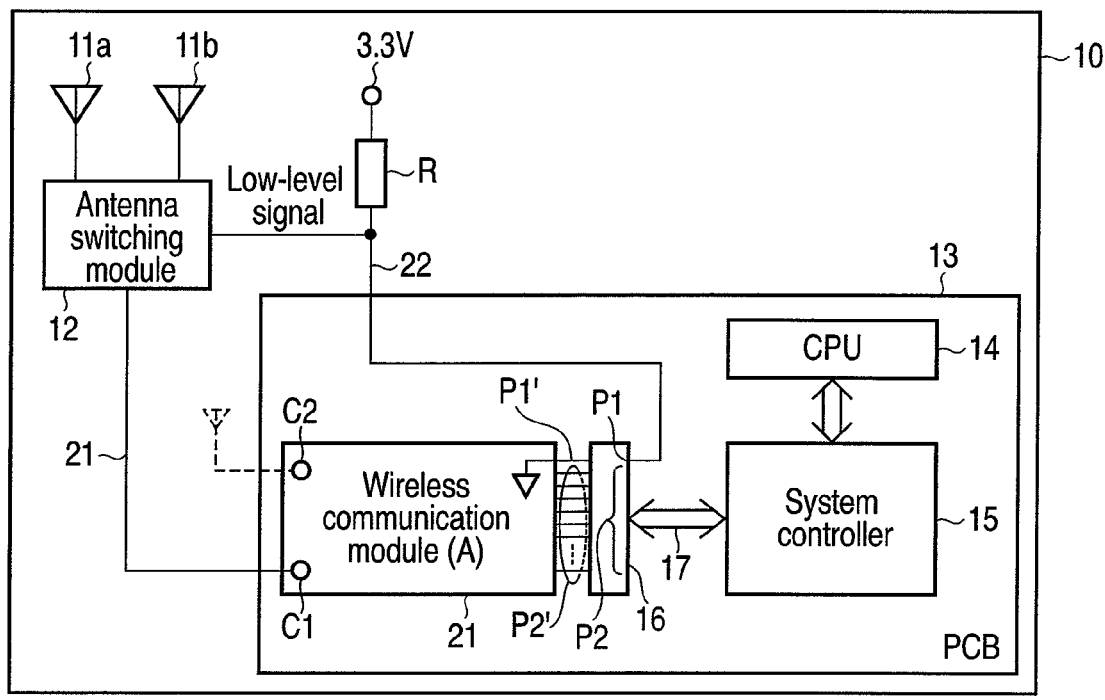
F I G. 1
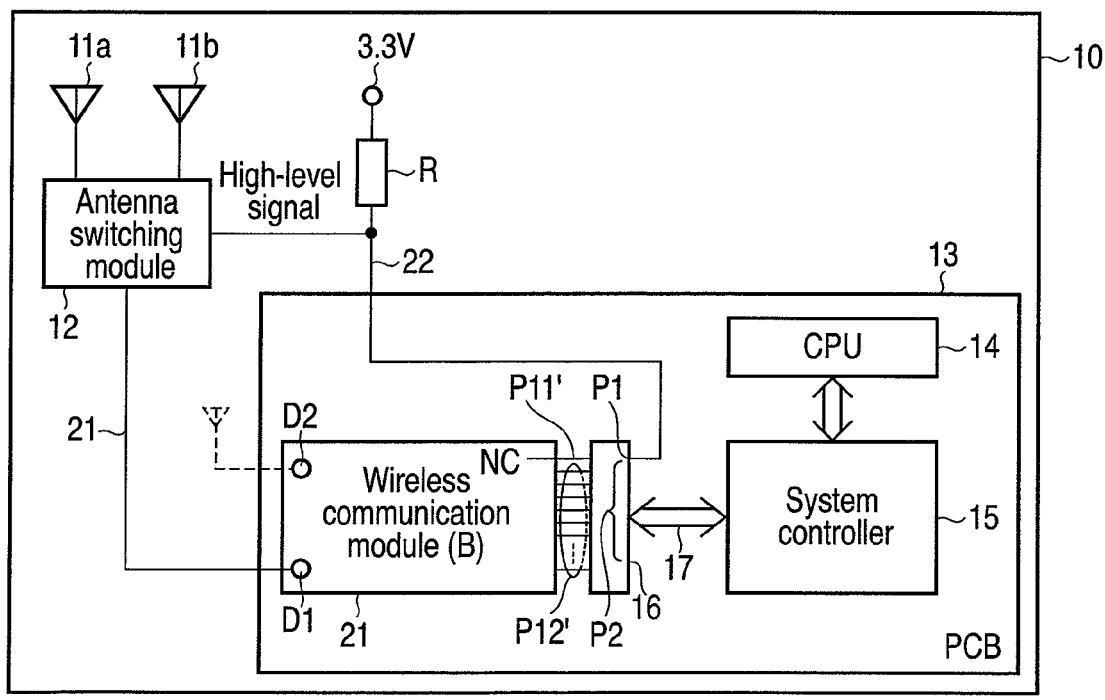
F I G. 2

INFORMATION PROCESSING APPARATUS UTILIZING AN ANTENNA SWITCH

CROSS-REFERENCE TO RELATED APPLICATIONS

This application is based upon and claims the benefit of priority from Japanese Patent Application No. 2009-272695, filed Nov. 30, 2009; the entire contents of which are incorporated herein by reference.

FIELD

Embodiments described herein relate generally to an information processing apparatus such as a personal computer, which has, for example, an antenna.

BACKGROUND

In recent years, various types of portable computers, such as notebook computers, have been developed. Most portable computers have a wireless communication function in order to perform a wireless communication with an external device such as an Internet server under the mobile environment.

Recently, various wireless communication systems have come into use in increasing numbers. It is now demanded that portable personal computers should have wireless communication modules that work with various wireless communication systems.

PCT International Publication No. 2007/060734 discloses an electronic apparatus that has two communication modules. Each of these communication modules uses two antennas, to receive and transmit data. The electronic apparatus has three antennas, one of which is used by both communication modules. The antenna shared by the communication modules can be connected to either communication module by an antenna changeover switch. When manipulated, the antenna changeover switch connects the shared antenna to one communication module and disconnects the shared antenna from the other communication module.

The more wireless communication modules the computer incorporates, the higher will be the manufacturing cost of the computer. Which communication systems are used to access to the Internet or a similar network usually depends on the user of the computer. In view of this, which wireless communication modules the computer should incorporate may be determined in accordance with the type of computer and the sales territory to which the computer will be shipped.

If the various types of wireless communication systems are allocated to different frequency bands, however, not only the wireless communication modules, but also the antennas must be changed in accordance with the type of computer and the sales territory to which the computer will be shipped. This limits the types of components that can be used in common in the computers of different types or in the computers that will be shipped to different sales territories. Consequently, the use of several wireless communication modules in the computer may raise the manufacturing cost of the computer.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram showing an exemplary system configuration that copes with the case where a first wireless module is incorporated in an information processing apparatus according to one embodiment;

FIG. 2 is an exemplary block diagram showing another exemplary system configuration that copes with the case where a second wireless module is incorporated in the information processing apparatus according to the embodiment;

DETAILED DESCRIPTION

Various embodiments will be described hereinafter with reference to the accompanying drawings.

In general, an information processing apparatus according to one embodiment includes a system board, a bus slot, a first antenna, a second antenna, and an antenna switching module. The bus slot is provided on the system board. The bus slot includes a first terminal not connected to a bus on the system board, and second terminals connected to the bus. The bus slot is configured to be connected to either a first wireless communication module or a second wireless communication module. The first communication module is configured to wirelessly transmit and receive signals by using a first frequency band, and includes a plurality of terminals for achieving communication with the bus via the second terminals, and a terminal connecting the first terminal to the ground. The second wireless communication module is configured to wirelessly transmit and receive signals by using a second frequency band, and includes a plurality of terminals for achieving communication with the bus via the second terminals, and a terminal keeping the first terminal in an open state. The first antenna covers the first frequency band. The second covers the second frequency band. The antenna switching module is configured to switch an antenna connected to be a feed line between the first antenna and the second antenna in accordance with a voltage on a control signal line connected to the first terminal.

FIG. 1 shows an exemplary system configuration of the information processing apparatus according to the embodiment. The information processing apparatus is implemented as, for example, a notebook computer 10. The computer 10 is designed to incorporate exclusively one of two wireless communication modules.

One of the two wireless communication modules is a module that performs wireless communication that accords with, for example, the third-generation (3G) mobile communication system. The other wireless module is, for example, a module that performs wireless communication that accords with, for example, the WIMAX (trademark) communication system. The 3G mobile communication system uses a frequency band of, for example, 800 MHz to 2.1 GHz. The WIMAX communication system uses a frequency band of 2.4 to 2.6 GHz.

Figure 3:
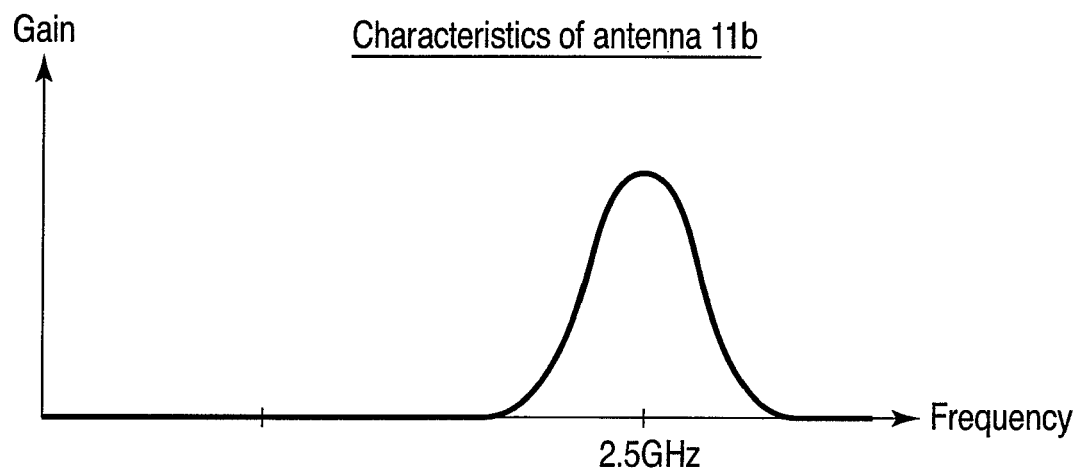
FIG. 3 is an exemplary diagram showing the resonance frequency characteristic of an antenna of the information processing apparatus according to the embodiment.
Figure 4:
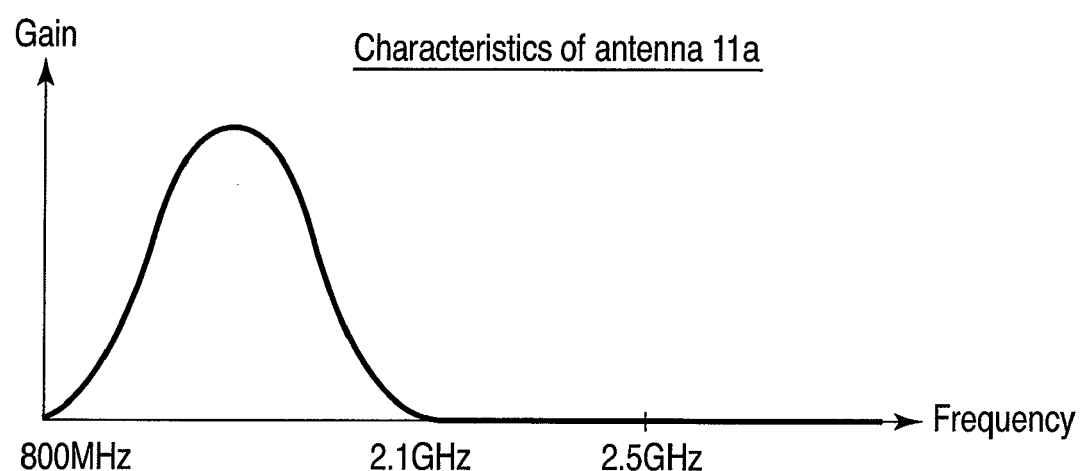
FIG. 4 is an exemplary diagram showing the resonance frequency characteristic of another antenna of the information processing apparatus according to the embodiment.

The computer 10 has two antennas 11a and 11b, an antenna switching module 12, and a system board 13. Antenna 11a is an antenna element for use in wireless communication modules that perform wireless communication that accords with, for example, the 3G mobile communication system. Thus, antenna 11a covers a frequency band of 800 MHz to 2.1 GHz as shown in FIG. 4. Antenna 11b is an antenna element for use in wireless communication modules that perform wireless communication that accords with, for example, the WIMAX communication system. Thus, antenna 11b covers a frequency band of 2.4 to 2.6 GHz as shown in FIG. 3.

The antenna switching module 12 is a switch circuit designed to make antennas 11a and 11b function as reconfigurable antennas in which the resonance frequency can be changed. The antenna switching module 12 is connected to both antennas 11a and 11b, and also to the system board 13 via a feed line 21. The feed line 21 is, for example, a coaxial cable. Further, the antenna switching module 12 is connected to the system board 13 via a control signal line 22. The control signal line 22 is connected to the power supply terminal (3.3 V) by, for example, a pull-up resistor R. The antenna switching module 12 is configured to switch an antenna connected to be the feed line 21 between the antenna 11a and the antenna 11b in accordance with the voltage (low or high) on the control signal line 22. That is, the antenna switching module 12 connects either antenna 11a or antenna 11b to the feed line 21, in accordance with a control signal (the voltage on the control signal line 22).

The system board 13 is, for example, a printed circuit board (PCB). On the system board 13, the various components of the computer 10, such as CPU 14, system controller 15, bus slot 16, bus 17 and various I/O devices (not shown) are provided. The CPU 14 is the processor that controls the other components of the computer 10. It executes an operating system, various application programs, a communication driver program, etc. The communication driver program is a program described to control the wireless communication module connected to the bus slot 16. (In the computer 10 shown in FIG. 1, the module is a wireless communication module 21.) The CPU 14 is connected via the system controller 15 to the bus 17. The CPU 14 therefore executes communication performed through the bus 17, such as data transfer with the wireless communication module 21.

The system controller 15 is a bridge device configured to control the various I/O devices and functions as a so-called chip set. The system controller 15 is connected not only to the CPU 14, but also to the bus 17. The bus 17 may be a serial bus such as PCI EXPRESS. Data, commands, etc. are transferred between the CPU 14 and the wireless communication module 21 through the system controller 15 and bus 17.

The bus slot 16 is connected to the bus 17. The bus slot 16 is implemented by, for example, a Mini PCI EXPRESS bus slot. Connected to the bus slot 16 is either a wireless communication module that wirelessly transmits and receives signals in accordance with the 3G mobile communication system, or a wireless communication module that wirelessly transmits and receives signals in accordance with the WIMAX communication system.

The bus slot 16 is a connector having, for example, 40 pins (terminals). The 40 pins include a first pin (terminal) P1 and second pins (terminals) P2. The first pin P1 is not connected to the bus 17, whereas the second pins P2 are connected to the bus 17. The first pin P1 is connected to the control signal line and used to control the voltage of the control signal supplied to the antenna switching module 12. If the control signal line is a cable, the first pin P1 is connected to the cable by a line provided on the system board 13.

The second pins P2 are used to accomplish communication with the bus 17. That is, the wireless communication module, which is connected to the bus slot 16, is connected to the bus 17 via the second pins P2 of the bus slot 16. Of the 40 pins the bus slot 16 has, one of some pins not used for the communication with the bus 17 is used as first pin P1. The bus slot 16 is used not only to accomplish communication with the bus 17 (communication with the CPU 14), but also to control the antenna switching module 12, in the present embodiment. The computer 10 is shipped, with the bus slot 16 connected to either the wireless communication module 21 or a wireless communication module 22.

FIG. 1 shows the case where the wireless communication module (A) 21 is connected to the bus slot 16. The wireless communication module (A) 21 is implemented as a 3G wireless communication module and uses a frequency band (800 MHz to 2.1 GHz) associated with the 3G mobile communication system, to wirelessly transmit and receive signals. The wireless communication module (A) 21 is provided in the form of, for example, a Mini PCI EXPRESS card that can be inserted into the bus slot 16.

The wireless communication module (A) 21 includes pins (terminals) P2' and a spare pin (terminal) P1'. Pins (terminals) P2' serve to perform communication with the bus 17 through the second pins P2. Pin (terminal) P1' is not used to achieve communication, but connects the first pin P1 to the ground. That is, pin P1' of the wireless communication module (A) 21 is connected to the first pin P1 provided in the bus slot 16 if the wireless communication module (A) 21 is connected to the bus slot 16. The first pin P1 is connected to the ground because pin P1' is connected to the ground terminal provided in the wireless communication module (A) 21. Pins P2' is connected to the bus 17 by the second pins P2. The wireless communication module (A) 21 performs a process of outputting the data which is wirelessly received from an external device, to the bus 17 through pins P2', and a process of wirelessly transmitting to the external device the data received from the CPU 14 through the bus 17 and pins P2'.

The wireless communication module (A) 21 further has an antenna connector C1. Antenna connector C1 is connected to the feed line (coaxial cable) 21. The wireless communication module (A) 21 may have another antenna connector C2 to attain diversity.

In the computer 10 of FIG. 1, the control signal line 22 is connected to the ground by the first pin P1 of the bus slot 16 and pin P1' of the wireless communication module (A) 21. The voltage on the control signal line 22 is therefore made low, and a logical "0" control signal is supplied to the antenna switching module 12. While supplied with the logical "0" control signal, the antenna switching module 12 maintains selection of antenna 11a, and connecting the same to the feed line 21. The wireless communication module (A) 21 can therefore use antenna 11a to perform communication with the external device in normal manner.

FIG. 2 shows a computer 10 in which a wireless communication module (B) 22 is connected to the bus slot 16. The wireless communication module (B) 22 is, for example, a WIMAX wireless communication module, and wirelessly transmit and receive signals in a frequency band of 2.4 to 2.6 GHz. The wireless communication module (B) 22 is implemented, also as a Mini PC1 EXPRESS card that can be inserted into the bus slot 16. The wireless communication module (B) 22 includes pins (terminals) P12' and a spare pin (terminal) P11'. Pins P12' are used to perform communication with the bus 17 via the second pins P2. The spare pin P11' is used to keep the first pin P1 in an open (floating) state. That is, while the wireless communication module (B) 22 remains connected to the bus slot 16, pin P11' of the wireless communication module (B) 22 is connected to the first pin P1 of the bus slot 16, but the spare pin P11' is not electrically connected (not connected [NC]) to the wireless communication module (B) 22. Pin P1 therefore remains in an open, or unconnected, state. Pins P12' of the wireless communication module (B) 22 are connected to the bus 17 by the second pins P2. The wireless communication module (B) 22 performs a process of outputting the data which is wirelessly received from the external device, to the bus 17 through pins P12', and a process of wirelessly transmitting the data received from the CPU 14 via the bus 17 and pins P12', to the external device.

The wireless communication module (B) 22 further has an antenna connector D1. Antenna connector D1 is connected to the feed line (coaxial cable) 21. The wireless communication module (B) 22 may have another antenna connector D2 to attain diversity.

In the computer 10 of FIG. 2, the voltage on the control signal line 22 is high because the first pin P1 of the bus slot 16 remains in an open state. Hence, a logical "1" control signal is supplied to the antenna switching module 12. While supplied with the logical "1" control signal, the antenna switching module 12 maintains selection of antenna 11b, and connecting the same to the feed line 21. The wireless communication module (B) 22 can therefore use antenna 11b to perform communication with the external device in normal manner.

Thus, the antenna to be used can be automatically selected in this embodiment, in accordance with the type of the wireless communication module connected to the bus slot 16. The antenna suitable for the wireless communication module incorporated in the computer 10 can therefore be easily selected, without using a controller dedicated to the control of the antenna switching module 12.

The exemplary positions of the wireless communication module, antennas and antenna switching module will be described, with reference to FIG. 5.

Figure 5:
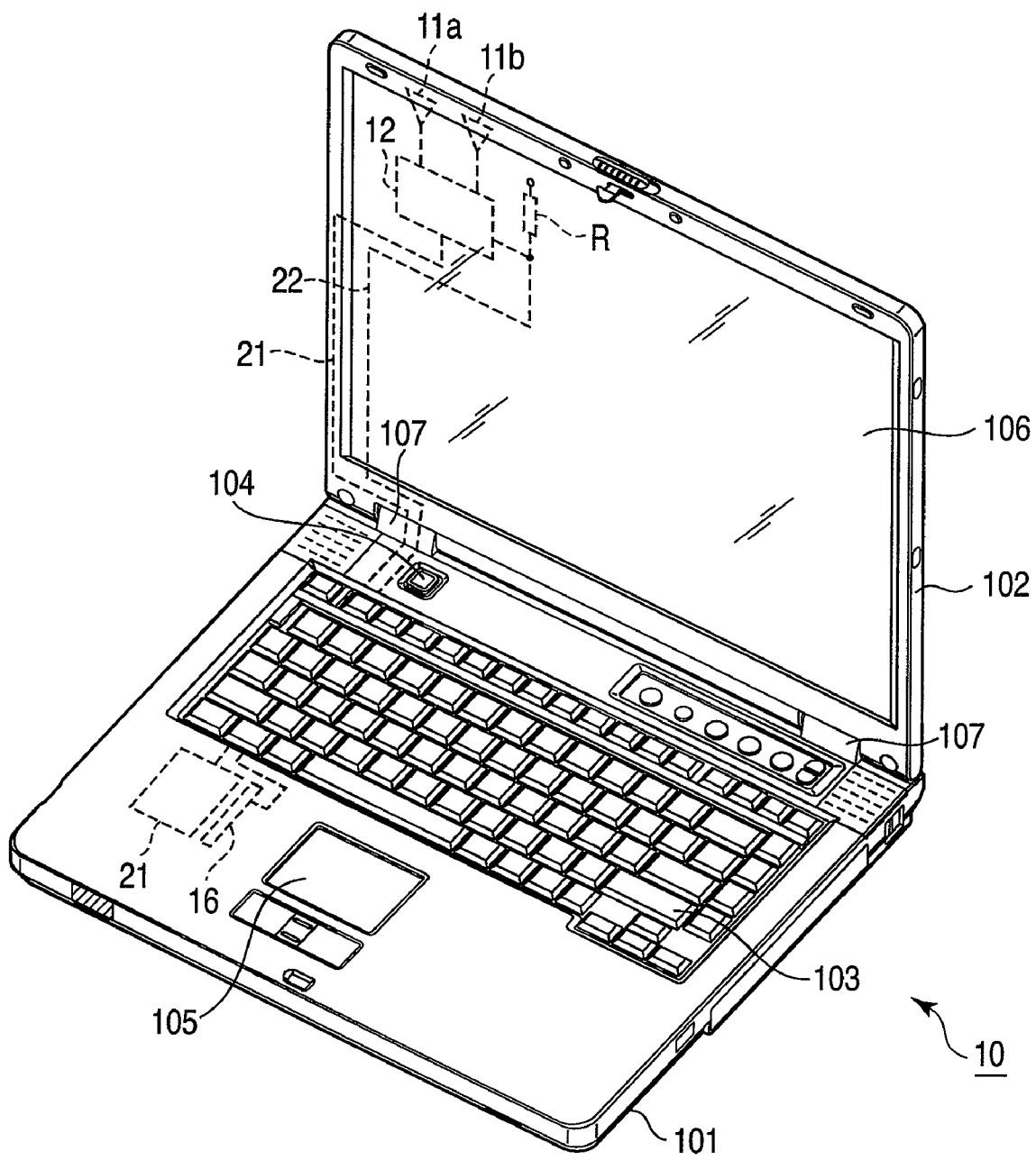
FIG. 5 is an exemplary perspective view of the information processing apparatus according to the embodiment, showing the positions where the wireless communication modules, antennas and antenna switching module are arranged.

FIG. 5 is a perspective view of the computer 10, whose display unit remains in the opened position. The computer 10 is composed of a computer main body 101, and a display unit 102. The display unit 102 is attached to the computer main body 101 and can be rotated. The display unit 102 incorporates a display, or liquid crystal display (LCD) 106. The LCD 106 has a display screen, which is located almost at the center of the display unit 102. The display unit 102 further incorporates antenna 11a, antenna 11b and antenna switching module 12. Provided in the display unit 102, antenna 11a and antenna 11b can assume relatively high positions, and can therefore serve to accomplish wireless communication with the external device.

The display unit 102 is attached to the computer main body 101 by a hinge module 107, and can therefore be rotated around the axis of the hinge module 107. The hinge module 107 is a coupling portion that couples the display unit 102 with the computer main body 101. That is, the hinge module 107, which is arranged at the rear edge of the computer main body 101, supports the display unit 102. The display unit 102 is attached to the computer main body 101 by the hinge module 107 and can rotate around the axis of the hinge module 107 between the opened position where it exposes the top of the computer main body 101 and the closed position where it covers the top of the computer main body 101.

The computer main body 101 has a housing. The housing is shaped like a thin box and incorporates the system board 13. On the top of the housing, a keyboard 103, a power button 104, and a touchpad 105 are arranged. When pushed, the power button 104 turns the computer 10 on or off.

The wireless communication module 21 (or the wireless communication module 22) connected to the bus slot 16 provided on the system board 13 is connected to the feed line 21. The feed line 21 extends into the space provided in the hinge module 107. The feed line 21 is, for example, a coaxial cable. The feed line 21 is led from the computer main body 101 through the hinge module 107 into the display unit 102. In the display unit 102, the feed line 21 is connected to the antenna switching module 12.

The control signal line 22 connected to the bus slot 16, too, is led from the computer main body 101 through the hinge module 107 into the display unit 102. A control cable extends through the hinge module 107, together with the feed line 21. The control cable is connected to pin P1 of the bus slot 16 by the cable terminal and lines provided on the system board 13. In the display unit 102, the control cable is connected to the control terminal of the antenna switching module 12.

In the computer 10, the display unit 102 incorporates the antenna 11, antenna 11b and antenna switching module 12, and antenna 11a or 11b is connected to the feed line 21, in accordance with the voltage on the control signal line 22 connected to the bus slot 16. The display unit 102 can therefore be a shared component for use in both a system configuration wherein the wireless communication module 21 is connected to the bus slot 16 and a system configuration wherein the wireless communication module 22 is connected to the bus slot 16.

The antenna switching module 12 could actually be arranged in the computer main body 101, but is provided in the display unit 102. Therefore, the number of cables led through the hinge module 107 can be smaller than in the case where the antenna switching module 12 is arranged in the computer main body 101.

As described above, in this embodiment, the bus slot to which the wireless communication module is connected can be used not only to achieve communication with the bus, but also to control the voltage on the control signal line. The computer can therefore selectively incorporate two wireless communication modules, though its configuration is simple. The embodiment uses two antennas that work in the frequency bands of the two wireless communication modules, respectively. Hence, the computer can easily acquire a greater antenna gain than in any configuration has one wideband antenna covering all necessary frequency bands.

In this embodiment, one wireless communication module is a 3G wireless communication module and the other wireless communication module is a WIMAX wireless communication module. Nevertheless, this embodiment can be applied to a combination of two wireless communication modules of any other wireless communication systems.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a system board;
a bus slot on the system board, comprising a first terminal not connected to a bus on the system board and second terminals connected to the bus, and configured to connect to a first wireless communication module or a second wireless communication module, the first wireless communication module being configured for wireless communication using a first frequency band and comprising a first plurality of terminals for communication with the bus through the second terminals of the bus slot, and a third terminal configured to connect the first terminal and a ground, and the second wireless communication module being configured for wireless communication using a second frequency band and comprising a second plurality of terminals for communication with the bus through the second terminals of the bus slot, and a fourth terminal configured to keep the first terminal in an open state;
an antenna switch connected to a feed line;
a first antenna connected to the antenna switch; and
a second antenna connected to the antenna switch;
wherein the antenna switch is connected to a control signal line connected to the first terminal of the bus slot, and
wherein the antenna switch is configured to switch between the first antenna and the second antenna in accordance with a voltage on the control signal line.

2. The information processing apparatus of claim 1, further comprising:
a main body incorporating the system board; and
a display rotatably attached to the main body,
wherein the first antenna, the second antenna and the antenna switch are in the display.

3. The information processing apparatus of claim 2, wherein the display is attached to the main body by a coupling portion, and
wherein the feed line and the control signal line are connected between the main body and the display through the coupling portion.

4. The information processing apparatus of claim 1, further comprising a processor on the system board and connected to the bus.

5. The information processing apparatus of claim 1, wherein the first wireless communication module is a third-generation (3G) mobile communication system using signals in a frequency band of 800 MHz to 2.1 GHz.

6. The information processing apparatus of claim 5, wherein the second wireless module is for wireless communication using signals in a frequency band of 2.4 to 2.6 GHz.

7. The information processing apparatus of claim 1, wherein at least one of the first and second wireless communication modules further comprises a first antenna connector connected to the feed line.

8. The information processing apparatus of claim 7, wherein the at least one of the first and second wireless communication module further comprises a second antenna connector, configured to connect to a third antenna.

9. An information processing apparatus comprising:
a main body;
a bus slot on a system board in the main body, comprising a first terminal not connected to a bus on the system board and second terminals connected to the bus, and configured to connect to a first wireless communication module or a second wireless communication module, the first wireless communication module being configured for wireless communication using a first frequency band and comprising a first plurality of terminals for communication with the bus through the second terminals of the bus slot, and a third terminal configured to connect the first terminal and a ground, and the second wireless communication module being configured for wireless communication using a second frequency band and comprising a second plurality of terminals for communication with the bus through the second terminals of the bus slot, and a fourth terminal configured to keep the first terminal in an open state;
a display rotatably attached to the main body;
an antenna switch in the display, the antenna switch being connected to a feed line;
a first antenna in the display, the first antenna being connected to the antenna switch; and
a second antenna in the display, the second antenna being connected to the antenna switch;
wherein the antenna switch is connected to a control signal line connected to the first terminal of the bus slot,
wherein the antenna switch is configured to switch between the first antenna and the second antenna in accordance with a voltage on the control signal line.

10. The information processing apparatus of claim 9, wherein the first wireless communication module is a third-generation (3G) mobile communication system using signals in a frequency band of 800 MHz to 2.1 GHz.

11. The information processing apparatus of claim 10, wherein the second wireless module is for wireless communication using signals in a frequency band of 2.4 to 2.6 GHz.

12. The information processing apparatus of claim 9, wherein at least one of the first and second wireless communication modules further comprises a first antenna connector connected to the feed line.

13. The information processing apparatus of claim 12, wherein the at least one of the first and second wireless communication module further comprises a second antenna connector configured to connect to a third antenna.

* * * * *